US012763511B2

(12) United States Patent
Mohlman et al.

(10) Patent No.: US 12,763,511 B2
(45) Date of Patent: Oct. 13, 2026

(54) CABLE CONNECTOR ASSEMBLY

(71) Applicant: The Boeing Company, Arlington, VA (US)

(72) Inventors: Shawn David Mohlman, Mill Creek, WA (US); Matthew B. Knuth, Kirkland, WA (US); Robert Arthur Nye, Land O Lakes, FL (US); Paula Mascagni Gatti, Everett, WA (US); Eduardo Montero-Valdez, Lynnwood, WA (US); Lawrence Britten Adamski, Marysville, WA (US); Lars Eric Blacken, Bothell, WA (US); Bradley J. Mitchell, Snohomish, WA (US); Jeffrey Alan McCaskey, Everett, WA (US); Ty Aaby Larsen, Duluth, MN (US); Ryan Patrick Rogers, Woodinville, WA (US); Joel Douglas Johnson, Everett, WA (US); Darren Chan, Thousand Oaks, CA (US); Grace L. Duncan, Lynnwood, WA (US); Damien O. Martin, Everett, WA (US)

(73) Assignee: The Boeing Company, Arlington, VA (US)

( * ) Notice: Subject to any disclaimer, the term of this patent is extended or adjusted under 35 U.S.C. 154(b) by 376 days.

(21) Appl. No.: 18/460,923

(22) Filed: Sep. 5, 2023

(65) Prior Publication Data

US 2025/0079749 A1 Mar. 6, 2025

(51) Int. Cl.
*H01R 13/508* (2006.01)
*H01R 13/11* (2006.01)
*H01R 13/58* (2006.01)

(52) U.S. Cl.
CPC ......... *H01R 13/508* (2013.01); *H01R 13/111* (2013.01); *H01R 13/5825* (2013.01)

(58) Field of Classification Search
CPC ............................ H01R 13/518; H01R 13/514
See application file for complete search history.

(56) References Cited

U.S. PATENT DOCUMENTS

| | | | | |
|---|---|---|---|---|
| 4,998,889 | A * | 3/1991 | Moly | H01R 13/629 439/247 |
| 5,366,388 | A * | 11/1994 | Freeman | H01R 13/74 439/540.1 |
| 9,564,724 | B2 * | 2/2017 | Ohnuki | H01R 13/518 |
| 9,748,691 | B2 * | 8/2017 | Soubh | H01R 12/716 |
| 10,759,358 | B2 * | 9/2020 | Nakano | B60R 16/0207 |
| 10,892,572 | B2 * | 1/2021 | Diessel | H01R 31/085 |
| 2024/0266795 | A1 | 8/2024 | Nye et al. | |

* cited by examiner

*Primary Examiner* — Ross N Gushi
(74) *Attorney, Agent, or Firm* — Alleman Hall LLP

(57) ABSTRACT

A cable connector assembly includes a module retainer and a set of two or more cable insert modules sized and shaped for removable retention within two or more module slots of the module retainer. A cable insert module of the set of two or more cable insert modules includes a cable insertion recess sized and shaped for insertion of a cable wire of a cable, a connectivity interface on an opposing face of the cable insert module, and a transmission path between the cable insertion recess and the connectivity interface.

22 Claims, 12 Drawing Sheets

CABLE CONNECTOR ASSEMBLY

FIELD

The invention relates generally to designs for cable connectors, and more particularly, to modular connector assemblies.

BACKGROUND

Various types of connectors are often used to conductively couple one cable to another, and/or couple a cable to an electronic device, for transmission of data and/or power. The specific size, shape, and design of the connector used is often influenced by the type, purpose, and location of the cable to which the connector is attached.

SUMMARY

This summary is not an extensive overview of the specification. It is intended to neither identify key or critical elements of the specification nor delineate any scope particular to embodiments of the specification, or any scope of the claims. Its sole purpose is to present some concepts of the specification in a simplified form as a prelude to the more detailed description that is presented in this disclosure.

To address at least the above issues, according to one aspect of the subject disclosure, a cable connector assembly includes a module retainer and a set of two or more cable insert modules sized and shaped for removable retention within two or more module slots of the module retainer. A cable insert module of the set of two or more cable insert modules includes a cable insertion recess sized and shaped for insertion of a cable wire of a cable, a connectivity interface on an opposing face of the cable insert module, and a transmission path between the cable insertion recess and the connectivity interface.

The features, functions, and advantages that have been discussed can be achieved independently in various embodiments or can be combined in yet other embodiments, further details of which can be seen with reference to the following description and drawings.

DETAILED DESCRIPTION

The present disclosure is directed to designs for connector assemblies usable for connecting electronic cables to one another, and/or connecting cables to suitable electronic devices, for transmission of data and/or power. Specifically, the present disclosure describes modular connector assemblies in which cables are attached to cable insert modules, which are removably retained within a module retainer. Cable wires of one or more cables are insertable into cable insertion recesses of the cable insert modules. The cable insert modules themselves are then attachable to suitable other components (e.g., such as connectors attached to other cables, or electronic devices) to thereby establish connectivity between such components and the cable wires, and enable transmission of data and/or power. For instance, a cable insert module coupled with a first cable may be attached to a second cable insert module coupled with a second cable to thereby establish connectivity between the two cables.

The designs described herein beneficially enable flexible and configurable connectivity between different shapes, sizes, types, and quantities of cables, while improving connector density as compared to other cable connector designs. For example, in some embodiments, a single module retainer accommodates several (e.g., ten or more) different cable insert modules, with a different cable attached to each cable insert module. Different cable insert modules may have different sizes, and/or different arrangements of cable insert recesses, to accommodate different sizes and types of cable wires. In some cases, one cable insert module includes two or more cable insertion recesses for attachment to two or more cable wires bundled together as part of the same cable—e.g., shielded or multi-conductor cables. Furthermore, the designs described herein are beneficially suited to automated production on an assembly line. This can improve the speed and consistency with which the connector assemblies are produced, decreases the ergonomic risk to human workers, and reduces the risk of inadvertent wire damage, improving overall product quality.

Figure 1:
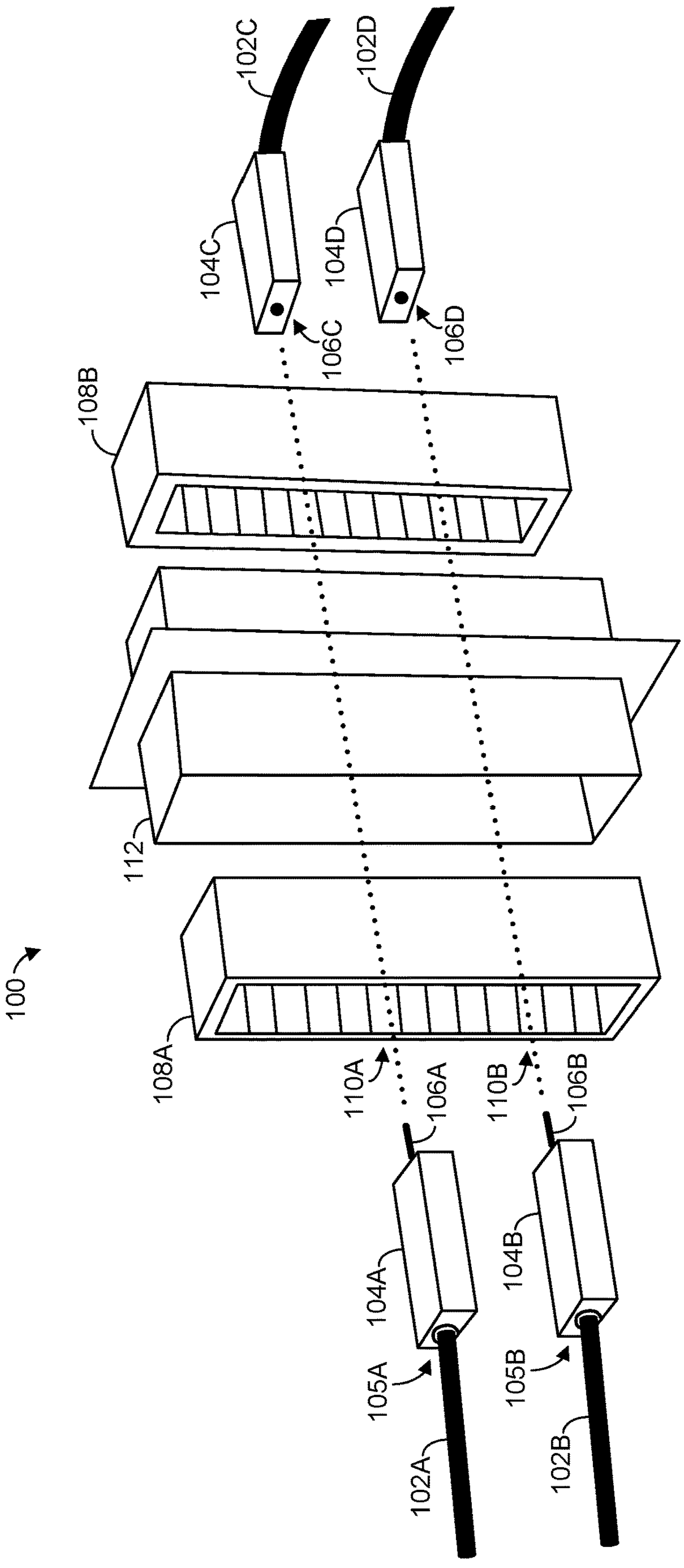
FIG. 1 depicts aspects of an example cable connector assembly in an exploded view.

FIG. 1 shows an exploded view of aspects of an example cable connector assembly 100. It will be understood that the specific components shown in FIG. 1, as well as the other FIGS. 2-8 described herein, are highly simplified for the sake of explanation. The sizes, shapes, and specific appearances of the components shown in FIGS. 1-8 are non-limiting and not drawn to scale. Furthermore, it will be understood that the components depicted in FIGS. 1-8 may be constructed from any suitable materials. For example, the cable insert modules, module retainers, retainer alignment adapters, cable enclosure elements, and other components described herein may be constructed from any suitable combination of plastics and/or metals.

In the example of FIG. 1, the cable connector assembly is used to establish connectivity between a first pair of cable wires 102A and 102C, and between a second pair of cable wires 102B and 102D. It will be understood that this is non-limiting, and that the connector assemblies described herein may be used to connect any suitable number of wires to one another, and/or to electronic devices such as PCBs. The present disclosure primarily focuses on electrically conductive cables used to transmit electrical power and/or data. However, in some examples, the connector assemblies described herein may be used with cables that are not electrically conductive, but include other suitable transmissive media, such as fiber optic cables.

As used herein, a "cable wire" includes a length of material used for transmission of data and/or power (e.g., copper wire, fiber optic), often coated with a protective material (e.g., plastic or rubber insulation, grounded shielding). In other words, the term "cable wire" is often used herein to refer to more than just the conductive (e.g., copper) or non-conductive (e.g., fiber optic) core of the cable, but may additionally refer to any coating, jacket insulation, and/or shielding applied to the core.

A "cable" includes one or more different cable wires. In cases where a cable only includes one cable wire, then the terms "cable wire" and "cable" may be used interchangeably. However, in some examples, one cable includes two or more cable wires bundled together. For instance, in some embodiments, a cable is a multi-conductor cable including two or more cable wires—e.g., different conductive copper wires are each coated in their own respective insulated cable jackets, and also bundled together in additional insulation and/or shielding to form a multi-conductor cable. In some embodiments, a cable is a shielded twisted pair cable, in which different cable wires include pairs of conductors twisted together and protected by an insulating jacket. The twisted pairs are themselves bundled together and enclosed by additional shielding and/or insulation to form the shielded twisted pair cable. In any case, it will be understood that the connector assemblies described herein may be used with a wide range of different suitable types of cables.

Continuing with FIG. 1, the cable connector assembly additionally includes cable insert modules 104A-D. As shown, each cable wire 102 is attached to a corresponding cable insert module 104. In this example, each cable insert module is only attached to one cable wire. However, as will be described in more detail below, multiple cable wires may in some cases be attached to the same cable insert module.

Each cable insert module defines a cable insertion recess sized and shaped for insertion of a cable wire. As shown, cable wire 102A is inserted into a cable insertion recess 105A of cable insert module 104A. The cable insertion recesses have any suitable size, based on the size of the cable intended for insertion into the cable insert module. As will be described in more detail below, different cable insert modules in some cases have different sized cable insertion recesses to accommodate different wire gauges.

In some cases, the cable insertion recess is sized to accommodate the insulation jacket surrounding the core of the cable wire (e.g., the copper wire or fiber optic material), such that some length of insulated cable is inserted into the cable insert module. In other examples, the insulation jacket may be trimmed such that only the cable core is inserted into the cable insert module.

For each cable insert module, any suitable length of cable wire may be inserted into the cable insertion recess. In general, the cable wire is inserted sufficiently far into the cable insert module so as to enable transmission of data and/or power between the cable wire and any components that are coupled with a connectivity interface on an opposing face of the cable insert module via a transmission path of the cable insert module. In this manner, a suitable component aligned and coupled with the connectivity interface is effectively coupled with the cable wire, enabling transmission of data and/or power between the cable wire and the component.

The connectivity interface takes any suitable form depending on the implementation. In general a "connectivity interface" refers to any facet or feature of the cable insert module on an opposing face from the cable insert recess, that facilitates transmission of data and/or power with another component that is aligned with and contacts the connectivity interface. This can include a conductive pin or socket integrated into the cable insert module, or a recess of the cable insert module through which conductive components affixed to the cable wire may extend.

As one non-limiting example, the connectivity interface of a cable insertion module may include a conductive pin that is conductively coupled with the cable wire, and sized and shaped for insertion into a pin insertion recess on another component—e.g., on a connector of a second cable, or a complementary interface of an electronic device. This is the case for connectivity interfaces 106A and 106B of cable insert modules 104A and 104B, which include conductive pins that are conductively coupled with corresponding cable wires 102A and 102B.

In some examples, the conductive pins are affixed to the ends of the cable wires—e.g., taking the form of plugs, jacks, or other cable terminators that are crimped, soldered, or otherwise attached to the cable wires and then inserted into the cable insert module. When such cable terminators are used, the cable wire is in some examples inserted sufficiently far into the cable insert module that the conductive pin extends through the connectivity interface of the opposing face of the cable insert module—e.g., the connectivity interface is a recess through which the conductive pin extends.

In other examples, the conductive pin is an integral component of the cable insert module. For instance, the cable terminator may remain within the cable insert module and make contact with conductive features within the cable insert module—e.g., the cable terminator may be retained within a complementary conductive socket defined within the cable insert module, with a conductive path between the socket and a conductive pin extending away from the cable insert module. In either case, any suitable mechanism (e.g., clips, crimping) may be used to hold the cable wire in place within the cable insert module so as to mitigate the risk of accidental removal.

As another example, a connectivity interface of a cable insertion module in some embodiments takes the form of a pin insertion recess sized and shaped for insertion of a conductive pin of a connector affixed to a cable. This is the case for connectivity interfaces 106C and 106D of cable insert modules 104C and 104D shown in FIG. 1. Specifically, connectivity interfaces 106C and 106D take the form of recesses or sockets conductively coupled with the cable wire inserted into the cable insert module, and/or conductively coupled with a plug, jack, or other termination that is affixed to the end of the cable wire. In this manner, insertion of a conductive pin into the pin insertion recess conductively couples the pin with the cable wire.

Each cable insert module is sized and shaped for removable retention within a module retainer. In this manner, a stacked set of cable insert modules may each be retained within the same single retainer, where each cable insert module is in some cases attached to a different cable. This conveniently enables the populated retainer to serve as a male plug and/or female receptacle for coupling the different cables with suitable other components—e.g., a similar populated retainer attached to a second set of cables, and/or an electronic device such as a PCB.

In FIG. 1, the cable connector assembly includes a module retainer 108A including a plurality of module slots, two of which are labeled as module slots 110A and 110B. Each module slot may be described as a shelf or notch that removably holds an inserted module in place within the retainer. These modules are primarily described as being "cable insert modules" as described above—e.g., modules including cable insertion recesses into which cable wires are insertable, and connectivity interfaces through which data and/or power may be exchanged with other components. However, as will be described in more detail below, "modules" can additionally refer to blank spacer modules that are insertable into the module retainer, but omit cable insertion recesses and connectivity interfaces. Rather, for instance, blank spacer modules may be used to enforce some degree of isolation and separation between different cable insert modules also inserted into the module retainer.

As will be described in more detail below, any suitable mechanism may be used to retain cable insert modules and/or blank spacer modules within module slots of a module retainer. For instance, in one example, each module includes one or more clips that, when the module is inserted into the retainer, occupy corresponding retention apertures of the module retainer. Additionally, or alternatively, the different modules may clip or otherwise attach to one another—e.g., modules may include complementary clips or other attachment features on their upper and lower faces, such that the modules are attachable together as a single stack.

It will be understood that a module retainer may include any suitable number of two or more module slots, depending on the implementation. In this example, the sizes of the depicted cable insert modules 104A/B are such that each cable insert module would, when retained within the module retainer 108A, occupy a single corresponding module slot within the module retainer. However, as will be described in more detail below, some cable insert modules are in some embodiments sized to occupy two or more corresponding slots in the module retainer. In general, each cable insert module is sized to occupy an integer number of module slots of the module retainer—e.g., one slot, two slots, or three slots.

FIG. 1 additionally shows a second module retainer 108B. Cable insert modules 104C and 104D comprise a second set of cable insert modules sized and shaped for removable retention within module slots of the second module retainer. Thus, in this example, two different module retainers are used to connect two different sets of cables—e.g., cable wire 102A is coupled with cable wire 102C, and cable wire 102B is coupled with cable wire 102D.

To this end, in FIG. 1, cable connector assembly 100 additionally includes a retainer alignment adapter 112 sized and shaped to hold module retainer 108A in alignment with module retainer 108B. This causes alignment and coupling between complementary cable insert modules retained in matching module slots within the two module retainers. For instance, when cable insert module 104A is retained within module retainer 108A, and module retainer 108A is held in place by the retainer alignment adapter 112, then the conductive pin 106A of the cable insert module would be aligned and inserted into the pin insertion recess 106C of cable insert module 104C, which is retained within module retainer 108B and also held in place by the retainer alignment adapter 112. This enables transmission of data and/or power between cable wire 102A and cable wire 102C. Connectivity may be established between any suitable number of cable wires and/or cables in this manner, depending on the number of cable insert modules retained within each module retainer, and depending on how many cable wires are insertable into each cable insert module.

Figure 2A:
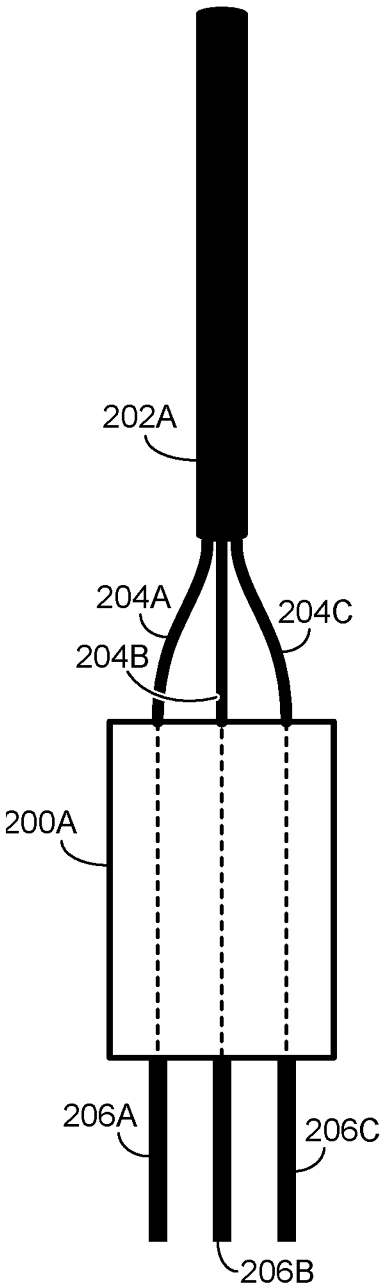
FIGS. 2A-C schematically show example cable insert modules with different example cable wires.

FIG. 2A shows a simplified representation of an example cable insert module 200 into which cable wires have been inserted. Specifically, as shown, a cable 202 includes three different cable wires 204A, 204B, and 204C, each of which are inserted into cable insert module 200. In other words, unlike the cable insert modules shown above with respect to FIG. 1, cable insert module 200 includes a second cable insertion recess for insertion of a second cable wire of a cable, and a second connectivity interface on the opposing face of the cable insert module, along with a third cable insertion recess and corresponding third connectivity interface. This beneficially enables connection of each cable wire of a multi-conductor cable to be attached to the same cable insert module. For instance, in examples where the module includes three or more cable insertion recesses, the inserted cable wires may include two phase wires and a ground wire of the cable—e.g., two twisted wires of a twisted-pair cable that carry power and/or data, and a ground wire that grounds a metal shielding of the twisted-pair cable. As will be described in more detail below, a cable insert module may include any suitable number of cable insertion recesses, corresponding to any suitable number of cable wires. The present disclosure primarily focuses on cases where each of the cable wires inserted into the same cable insert module are bundled together as the same "cable," although it will be understood that this need not be the case—e.g., in other examples, cable wires of two or more different cables may be inserted into the same module.

Furthermore, in FIG. 2A, three conductive pins 206A, 206B, and 206C extend from the cable insert module, which are examples of connectivity interfaces as described above. In other words, there is a transmission path between each cable insertion recess and each connectivity interface, which enables a cable wire inserted into the cable insertion recess to transmit data and/or power to a component conductively coupled with the connectivity interface—e.g., a conductive recess into which the conductive pin is inserted. This is indicated by the dashed lines extending from the insertion positions of the cable wires to the conductive pins.

The transmission path may take any suitable form depending on the implementation. In general, a transmission path refers to an internal portion of the cable insert module that facilitates transmission of data and/or power. In some examples, the transmission path takes the form of a channel within the cable insert module through which the cable wire extends—e.g., the data and/or power is transmitted by the wire itself as it extends through the cable insert module. For instance, as described above, the conductive pin is in some cases a feature of a conductive jack, plug, or other cable terminator that is affixed to the end of the cable wire, and extends through a connectivity interface. Thus, the transmission path may in some cases be an internal channel that allows the cable wire to pass from the cable insert recess, through the length of the cable insert module, and extend as a conductive pin through an opposing face of the module.

In other examples, the transmission path may take the form of internal conductive components that contact the end of the cable wire within the cable insert module, or a cable terminator affixed to the end of the cable wire, and transmit data and/or power from the cable wire through the cable insert module to the connectivity interface. For example, the conductive pins 206A-C of FIG. 2A may take the form of integrated conductive plugs that are built into the cable insert module, and that make conductive contact with the end of the cable wire within the interior of the cable insert module.

Figure 2B:
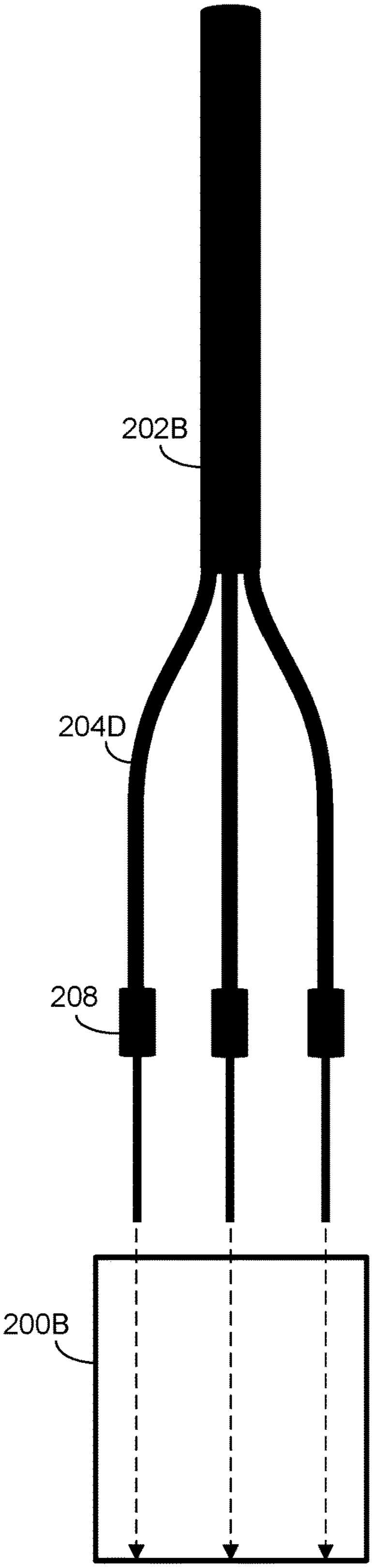
Figure 2C:
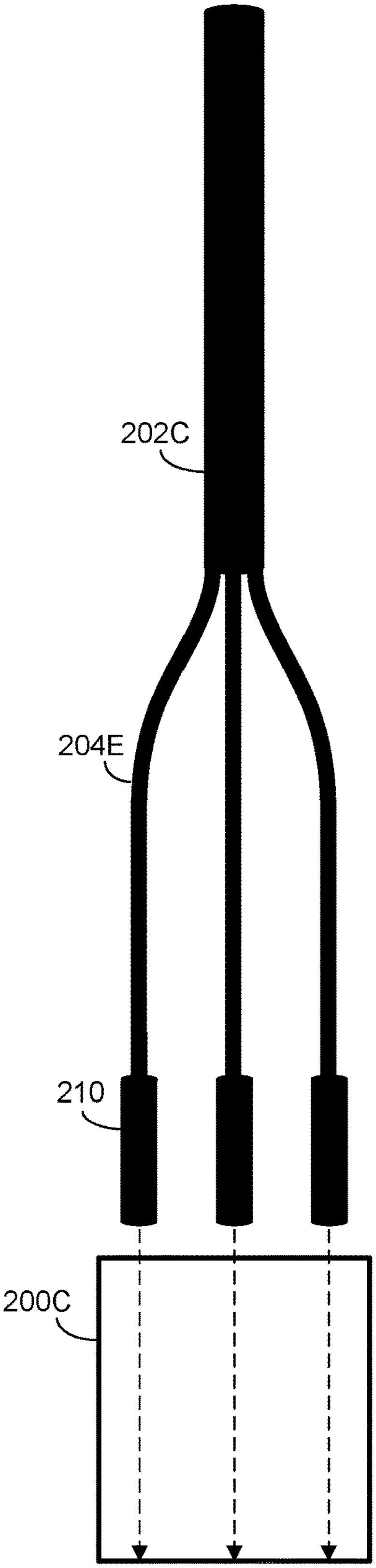

FIGS. 2B and 2C schematically illustrate examples where the connectivity interfaces include elements attached to the tips of the cable wires. Specifically, FIG. 2B schematically shows another example cable insert module 200B and cable 202B. As shown, cable 202B includes several cable wires, one of which is labeled as cable wire 204B. A pin contact 208 is crimped onto a tip portion of the cable wire 204D. By inserting the cable wire 204B and pin contact 208 into the cable insert module 200B, a connectivity interface may be established, taking the form of a conductive pin.

Similarly, FIG. 2B schematically shows another example cable insert module 200C and cable 202C. Cable 202C includes several cable wires, one of which is labeled as cable wire 204E. A socket contact 210 is crimped onto a tip portion of the cable wire 204E. By inserting cable wire 204E and socket contact 210 into the cable insert module 200C, a connectivity interface may be established, taking the form of a pin insertion recess.

FIGS. 3A-3I depict example components of a cable connector assembly in more detail. As discussed above, it will be understood that the specific shapes, sizes, and appearances of the components depicted in FIGS. 1-8, including those shown in FIGS. 3A-I, are non-limiting, simplified for the sake of illustration, and not necessarily drawn to scale.

Figure 3A:
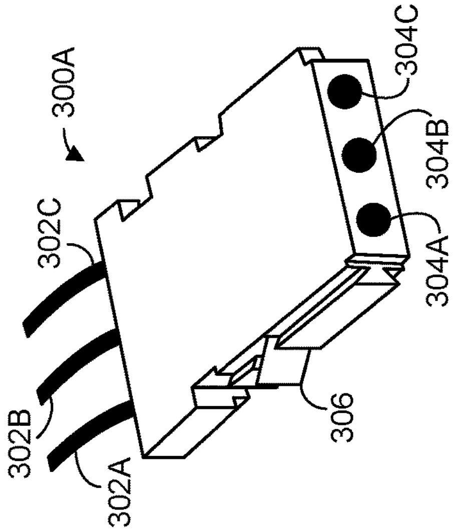
FIGS. 3A-3I depict example components of a cable connector assembly.

FIG. 3A depicts an example cable insert module 300A. As with cable insert module 200 shown in FIG. 2, three different cable wires 302A, 302B, and 302C are inserted into cable insertion recesses of the cable insert module. The cable insert module additionally includes three connectivity interfaces 304A, 304B, and 304C, which in this example take the form of pin insertion recesses, such as socket contacts, sized and shaped for insertion of conductive pins. As discussed above, cable insert module 300A includes transmissive paths between the cable insertion recesses and the connectivity interfaces, such that transmission of data and/or power is facilitated between the cable wires and any conductive pins inserted into the connectivity interfaces.

Additionally, in FIG. 3A, cable insert module 300A includes a retention clip 306. The retention clip is used to removably retain the cable insert module within a module slot of a module retainer. For instance, in some embodiments, when the cable insert module is inserted into a module slot of a module retainer, the retention clip occupies a corresponding retention aperture of the module retainer to removably retain the cable insert module within the retainer. It will be understood that a single cable insert module may include any suitable number of retention clips, including zero retention clips in embodiments where a different suitable retention mechanism is used.

Though not shown in FIG. 3A, in some examples, cable insert modules may include identifier markings (e.g., printed or laser-marked characters) that are visible even when the cable insert modules are retained within the module retainer. For instance, the module retainer may include windows aligned with the module slots, such that the identifier markings of any inserted cable insert modules are visible from outside the module retainer. This can beneficially reduce the risk that cable insert modules are inadvertently inserted into the incorrect module slots—e.g., a human overseer and/or computer vision system can detect the identifier markings and verify that each cable insert module is correctly inserted into its appropriate slot.

In some cases, cable insert modules are shaped with asymmetrical geometry to facilitate automated insertion and/or reduce the risk that the cable insert module is inserted into the module retainer in an incorrect orientation. For example, relative to the frame of reference of FIG. 3A, a “left” side of the cable insert module (e.g., the side proximal to connectivity interface 304A) may be differently shaped than the “right” side (e.g., the side proximal to connectivity interface 304C). This may serve to prevent the cable insert module from being inserted into the retainer the “wrong way”—e.g., with the connectivity interfaces oriented toward the rear of the retainer where cables are meant to be inserted. In some examples, the sides of the cable insert modules may use concave, pyramidal, and/or chamfered geometry, which can beneficially facilitate easier robotic manipulation by automated systems—e.g., providing a contoured surface that makes the cable insert module easier to grip by a gripping tool.

Figure 3B:
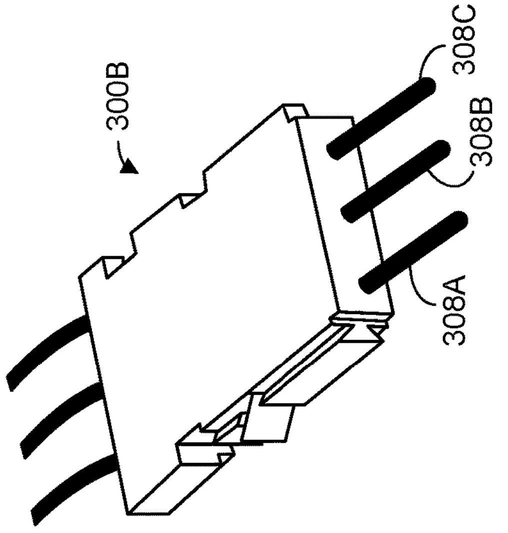

FIG. 3B schematically illustrates another example cable insert module 300B. Cable insert module 300B is similar to cable insert module 300A, although like cable insert module 200 of FIG. 2, the connectivity interfaces 308A, 308B, and 308C of cable insert module 300B include conductive pins rather than pin insertion recesses. Notably, cable insert modules 300A and 300B are complementary—e.g., the cable wires attached to cable insert module 300A may be conductively coupled with the cable wires attached to cable insert module 300B via the insertion of the conductive pins 308 of module 300B into the pin insertion recesses of cable insert module 300A.

As discussed above, in some embodiments, not all cable insert modules are the same size and/or include the same number of connectivity interfaces—e.g., conductive pins and/or pin insertion recesses. In other words, in some examples, the set of cable insert modules removably retained in a module retainer includes a first cable insert module, and a second cable insert module having a different number of connectivity interfaces from the first cable insert module. Additionally, or alternatively, the second cable insert module may have a different size from the first cable insert module. For instance, in one example, the first cable insert module occupies one module slot of the module retainer, and the second cable insert module has a larger size than the cable insert module, such that the second cable insert module occupies more than one slot of the module retainer.

Figure 3C:
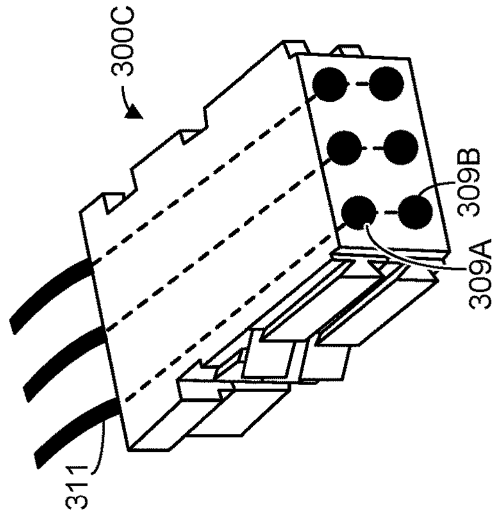

This is illustrated with respect to FIG. 3C, showing another example cable insert module 300C. As compared to cable insert modules 300A and 300B, cable insert module 300C has a different number of connectivity interfaces—e.g., six pin insertion recesses as compared to three pin insertion recesses for cable insert module 300A and three conductive pins for cable insert module 300B. Two of the pin insertion recesses of cable insert module 300C are labeled as recesses 309A and 309B. Similarly, cable insert module 300C has a larger size than cable insert modules 300A and 300B. In this example, cable insert modules 300A and 300B are sized such that they would each occupy one module slot upon insertion into a module retainer, while cable insert module 300C would occupy two module slots of the module retainer.

In the example of FIG. 3C, the pin insertion recesses of cable insert module 300C are arranged as two rows of three recesses. However, it will be understood that this is non-limiting. Rather, as discussed above, a single cable insert module may include any suitable number of connectivity interfaces, which may be arranged in any suitable way. Additional non-limiting examples of different connectivity interface arrangements will be described below with respect to FIG. 6.

In some examples, particularly those in which cable insert modules include two or more rows of connectivity interfaces, the modules may incorporate internal bussing. This is illustrated by the dashed lines shown relative to cable insert module 300C in FIG. 3C. In this example, data and/or power entering the cable insert module by way of either pin insertion recess 309A or 309B is propagated via the same internal bus to cable wire 311 inserted into the cable insert module. Similarly, any data and/or power entering the cable insert module by way of cable wire 311 is propagated via the internal bus to both of pin insertion recesses 309A and 309B.

Figure 3D:
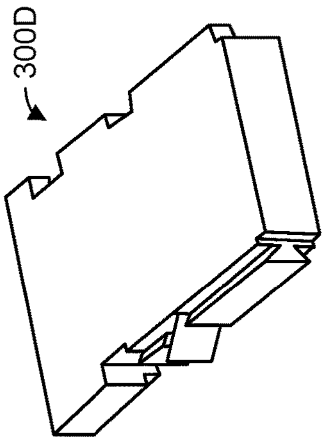

As discussed above, "modules" as used herein may include one or more blank spacer modules that are insertable into the module retainer, but are not coupled with cable wires of a cable. FIG. 3D shows one non-limiting example of a blank spacer module 300D. Blank spacer modules are sized and shaped for removable retention within module slots of the module retainer, just as with the cable insert modules described herein. However, blank spacer modules omit cable insertion recesses and connectivity interfaces. Rather, their function is to occupy space within the module retainer and enforce physical separation between cable insert modules into which different cables are inserted. This can, for instance, satisfy separation codes that dictate some degree of separation between different types of cables—e.g., to reduce the risk that the two cables come into contact or otherwise interfere with one another. As another example, blank spacer modules can be used to provide a keying function, such that two filled module retainers cannot be crossed or misconnected within a retainer alignment adapter—e.g., a misalignment would cause conductive pins of one cable insert module to contact the blank face of a blank spacer module rather than conductive pins of an incorrect cable insert module.

Figure 3F:
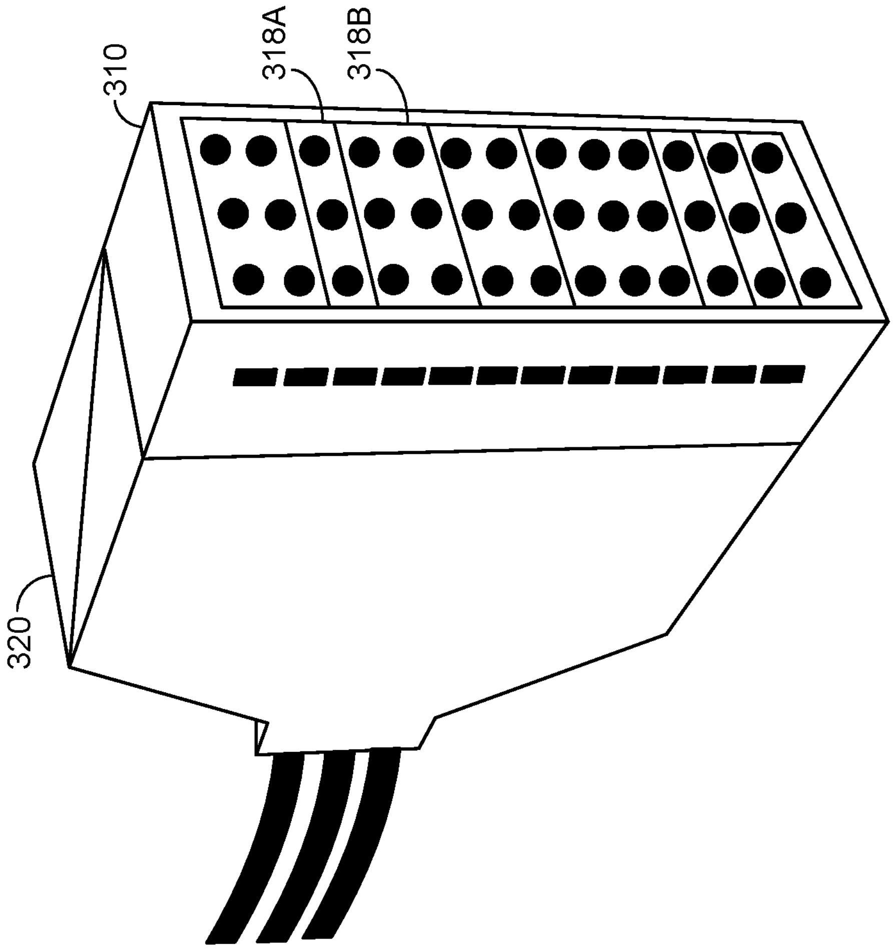
Figure 3E:
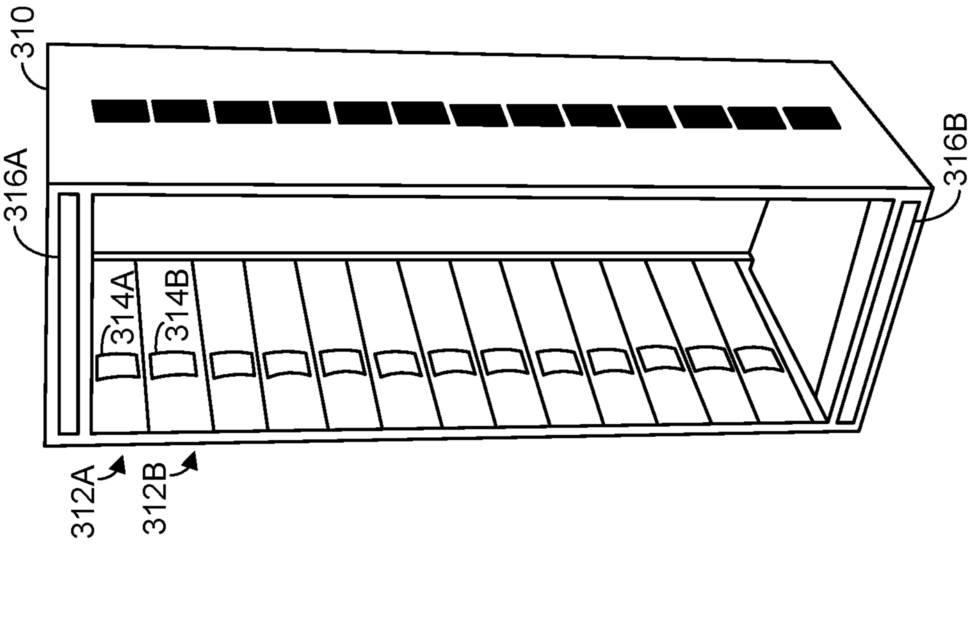

FIG. 3E depicts a non-limiting example of a module retainer 310. As shown, module retainer 310 includes a plurality of module slots into which cable insert modules and/or blank spacer modules may be inserted, two of which are labeled as module slots 312A and 312B. As discussed above, any suitable mechanism may be used to retain modules within module slots of the module retainer. For instance, in FIG. 3E, module retainer 310 includes a plurality of retention apertures, two of which are labeled as 314A and 314B. Insertion of a module (e.g., module 300A of FIG. 3A) into module slot 312A may cause a retention clip (e.g., clip 306) to occupy the retention aperture 314A, thereby retaining the module within the module slot. Additionally, or alternatively, apertures in a module retainer such as those shown in FIG. 3E may function as windows through which identifying markings on the modules are visible, as described above.

Furthermore, in FIG. 3E, module retainer 310 includes two enclosure element insertion recesses 316A and 316B. As will be described in more detail below, the cable connector assembly in some cases includes a cable enclosure element to at least partially limit movement of cables relative to the module retainer. In the example of FIG. 3E, enclosure element insertion recesses 316A and 316B receive tabs of a cable enclosure element to thereby removably affix the cable enclosure element to the module retainer. However, it will be understood that cable connector assemblies as described herein need not always include cable enclosure elements, and that in cases where cable enclosure elements are included, they may be affixed to the module retainer in any suitable way.

FIG. 3F depicts a non-limiting example of a cable connector assembly in which several of the components described herein are assembled together. Specifically, FIG. 3F again shows module retainer 310, although in this example the retainer is fully populated with cable insert modules. Two cable insert modules are labeled as modules 318A and 318B. As shown, different cable insert modules inserted into the module retainer occupy different numbers of module slots—e.g., cable insert module 318A occupies one module slot, while cable insert module 318B occupies two module slots. In the example of FIG. 3F, every inserted cable insert module uses pin insertion recesses, although it will be understood that this is non-limiting. Rather, any or all of the cable insert modules inserted into the module retainer may include conductive pins in addition to, or instead of, pin insertion recesses.

As discussed above, one or more cable wires may be inserted into cable insertion recesses of each cable insert module. The cable wires may be bundled together as any suitable number of cables, three of which are shown in FIG. 3F. In this example, movement of the cables relative to the module retainer is at least partially limited by a cable enclosure element 320, which is removably attached to the module retainer. For instance, tabs of the cable enclosure element may be inserted into the enclosure element insertion recesses 316A and 316B shown in FIG. 3E. In some examples, the cable enclosure element comprises two separable halves that collectively enclose a portion of the cables attached to cable insert modules in the module retainer. More details relating to cable enclosure elements will be provided below.

Figure 3H:
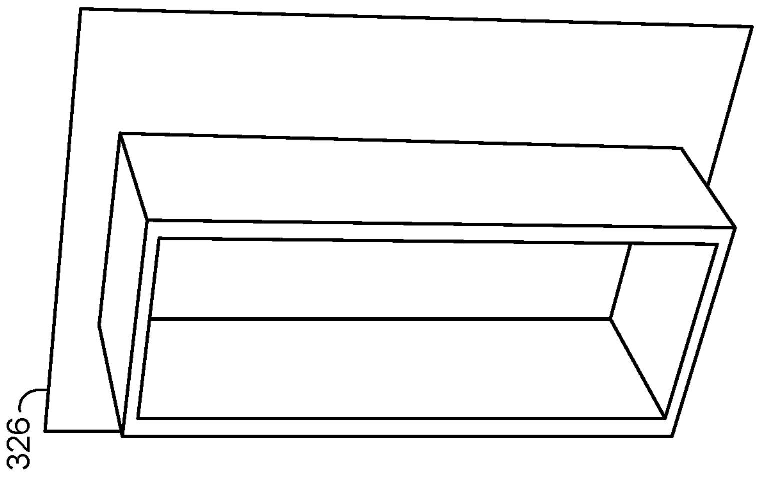
Figure 3G:
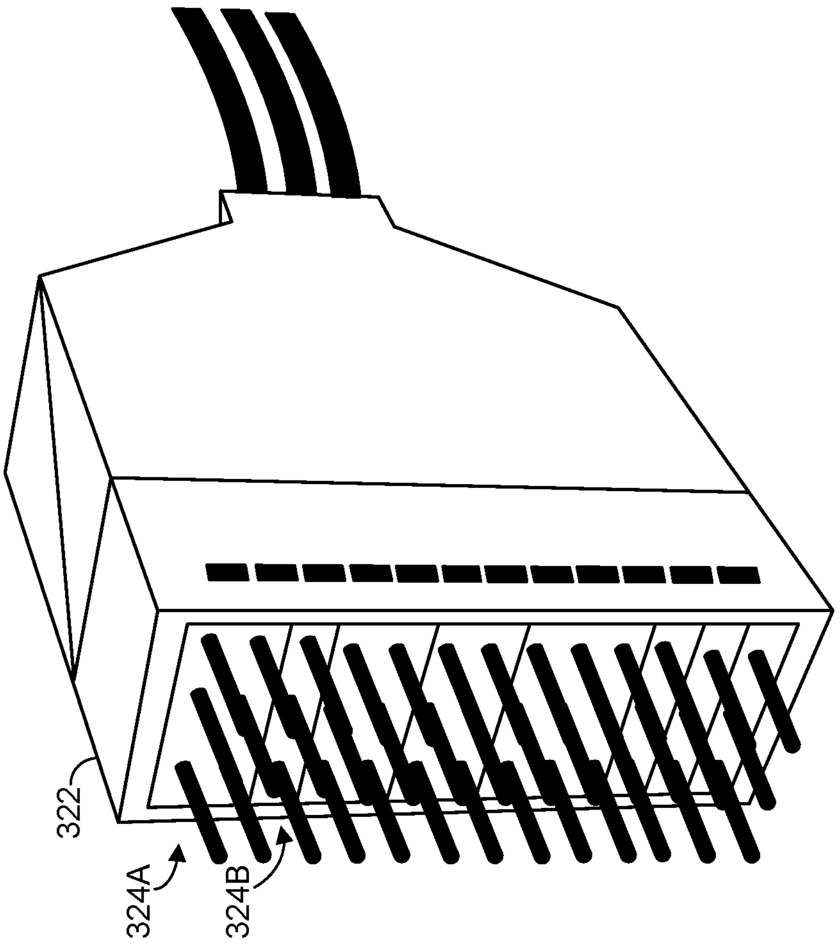

FIG. 3G depicts another non-limiting example of a cable connector assembly. Specifically, FIG. 3G shows another example module retainer 322 populated with a plurality of cable insert modules, two of which are labeled as cable insert modules 324A and 324B. As compared to FIG. 3F, the cable insert modules in module retainer 322 include conductive pins instead of pin insertion recesses. Notably, the arrangement depicted in FIG. 3G is compatible with the arrangement of FIG. 3F—e.g., in other words, cable insert modules of retainer 322 may be mated with cable insert modules of retainer 310 to facilitate transmission of data and/or power between cables attached to the cable insert modules.

FIG. 3H depicts a non-limiting example retainer alignment adapter 326. As described above with respect to FIG. 1, the retainer alignment adapter is sized and shaped to hold two module retainers in alignment with one another, such that the connectivity interfaces (e.g., conductive pins and pin insertion recesses) of cable insert modules inserted into the retainer alignment adapter are aligned and coupled. For instance, each of module retainers 322 and 310 may be inserted into the retainer alignment adapter 326 to facilitate mating between the cable insert modules of retainer 322 and the cable insert modules of retainer 310.

Figure 3I:
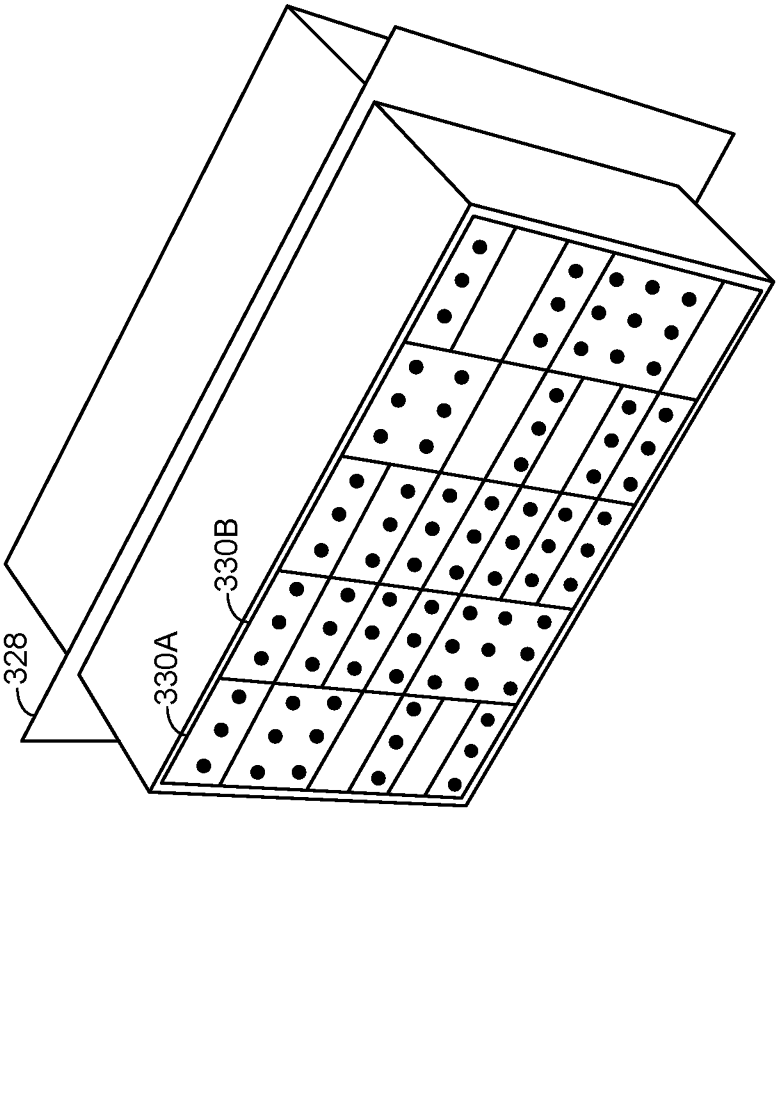

FIG. 3I depicts a non-limiting example of a multi-retainer alignment adapter 328. Similar to the retainer alignment adapter 326 shown in FIG. 3H, muti-retainer alignment adapter 328 is used to hold pairs of module retainers in alignment with one another. However, in the example of FIG. 3H, only one pair of module retainers are held by the retainer alignment adapter 326. In FIG. 3I, five pairs of module retainers are held within the multi-retainer alignment adapter 328. Two individual module retainers within the multi-retainer alignment adapter 328 are labeled as module retainers 330A and 330B.

Figure 4:
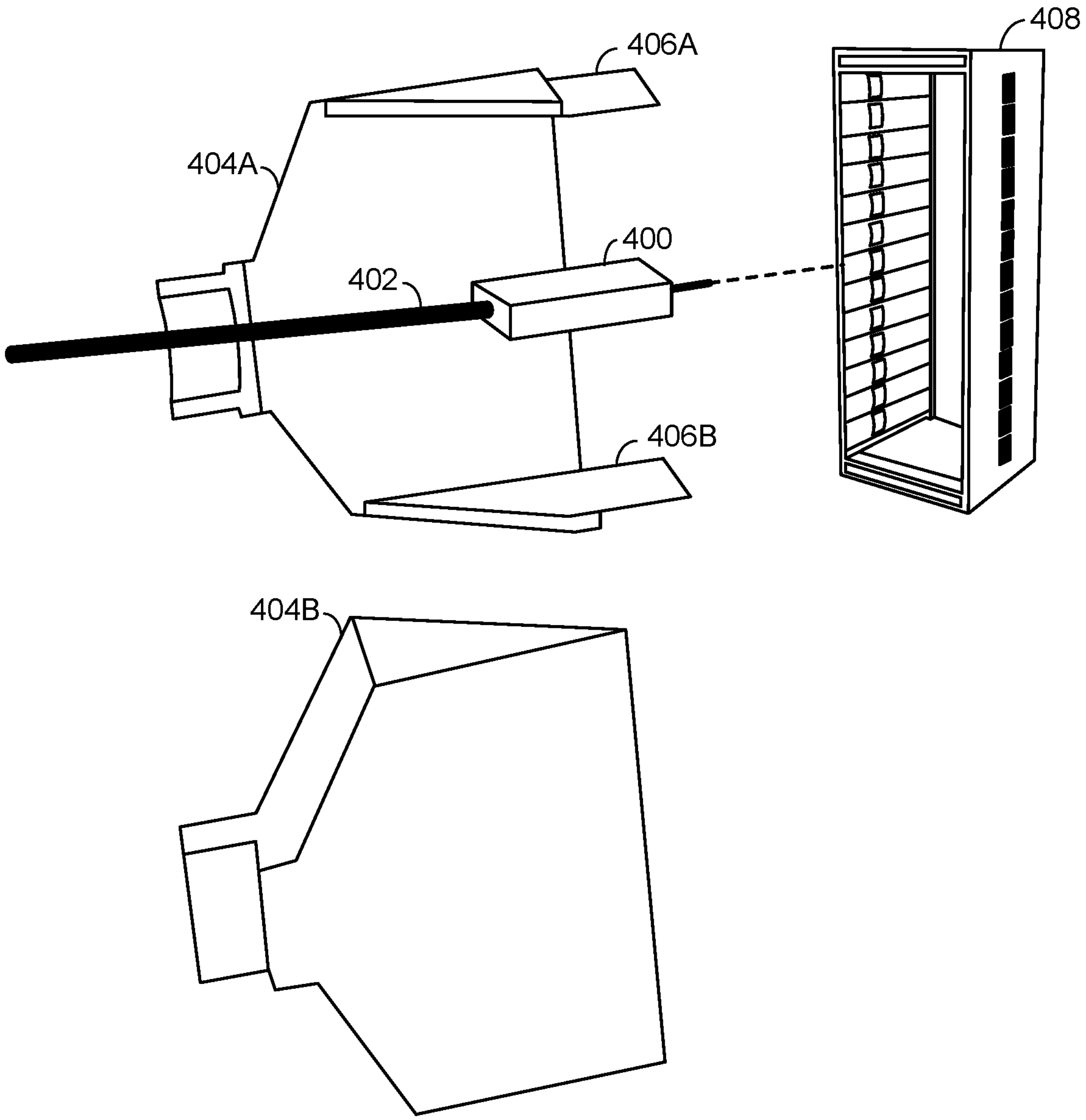
FIG. 4 illustrates the use of a cable enclosure element to provide strain relief and electromagnetic interference (EMI) shielding with a cable insert module as part of a cable connector assembly.

FIG. 4 illustrates the use of a non-limiting example cable enclosure element with a cable insert module. Specifically, FIG. 4 shows an example cable insert module 400, into which a cable wire 402 has been inserted. Additionally, FIG. 4 shows two halves 404A and 404B of a cable enclosure element, similar to cable enclosure element 320 shown in FIG. 3F. The cable enclosure element includes tabs 406A and 406B used to attach the cable enclosure element to a module retainer, such as module retainer 408. In other words, in this example, the cable enclosure element takes the form of two separable halves that, when joined, collectively enclose at least a portion of the cable, as is shown in FIG.

3F. This serves to limit movement of the cable relative to the module retainer and thereby mitigate strain applied to the connectors due to cable movement.

It will be understood that, in cases where the cable enclosure element comprises two separable halves, the cable connector assembly may use either, both, or neither of the two halves. In one scenario, half of the cable enclosure element is specifically used to provide strain relief, while the other half of the element is specifically used to provide electromagnetic interference (EMI) shielding. As such, in examples where strain relief is desired but not EMI shielding, then only one half of the cable enclosure element may be used. Alternatively, in cases where EMI shielding is desired, then both halves of the cable enclosure element may be used, such that the second half provides EMI shielding for the cables enclosed by the cable enclosure element. In cases where neither strain relief nor EMI shielding is needed, then both halves may be omitted. The cable enclosure element is constructed from any suitable materials depending on the implementation. In some embodiments, the cable enclosure element is constructed from metalized plastic, which can beneficially provide EMI shielding and a ground point for grounded cable shielding.

Figure 5:
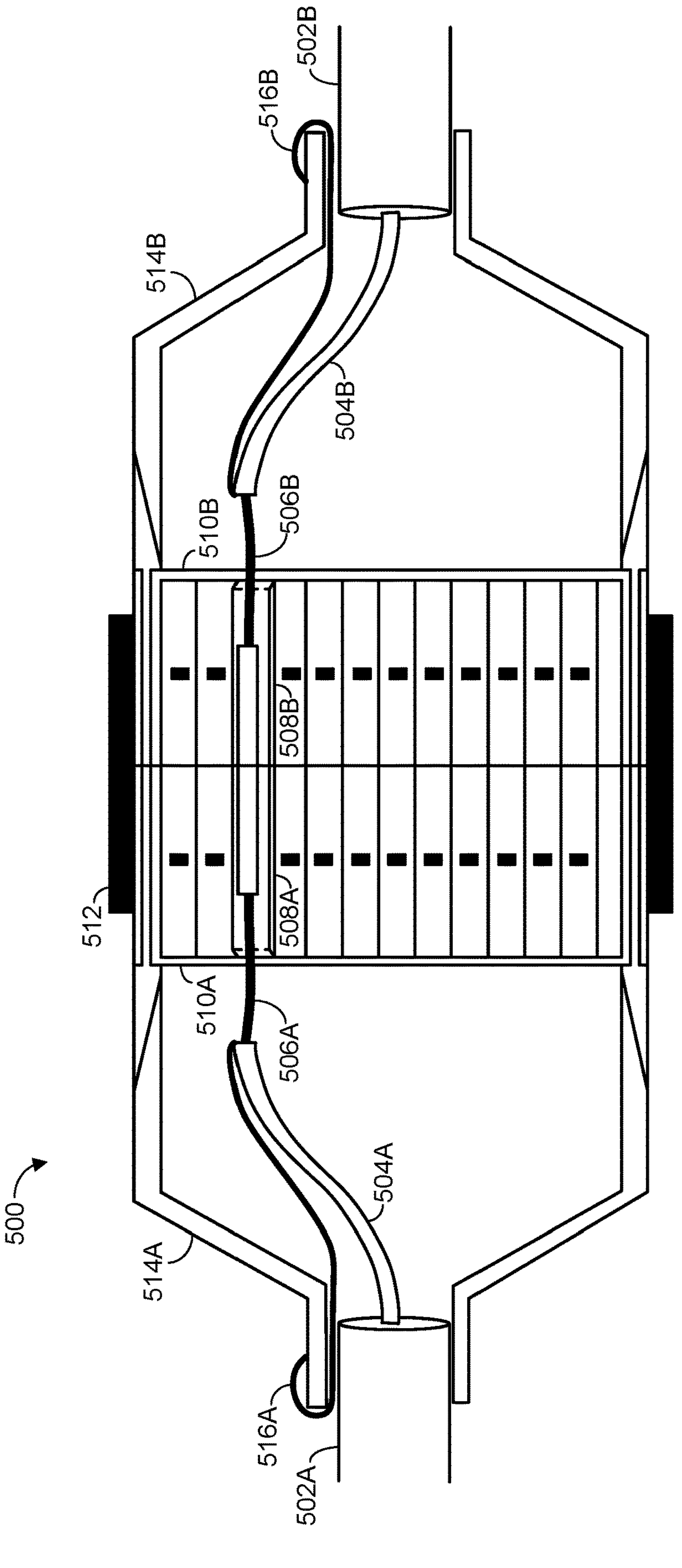
FIG. 5 shows a cross-sectional view of aspects of an example cable connector assembly.

FIG. 5 schematically shows a cross-sectional view of aspects of an example cable connector assembly 500. Cable connector assembly 500 includes two cables 502A and 502B. For the sake of clarity, in this example, each cable includes a single shielded cable wire 504A and 504B. However, as discussed above, it will be understood that a cable connector assembly may be used with any suitable number of cables, and each cable may include any suitable number of cable wires bundled together. In this example, the portions of the cable wires are protected by a grounding cable shielding, which is cut away to reveal the insulated cable jackets 506A and 506B. The insulated cable wires extend into respective cable insert modules 508A and 508B, retained in respective slots of module retainers 510A and 510B. The module retainers are themselves held within a retainer alignment adapter 512. Cable enclosure elements 514A and 514B are removably attached to the module retainers.

In this example, the cable wires include a layer of grounded shielding. These are grounded to the cable enclosure elements 514A and 514B via ground wires 516A and 516B. In other words, in this example, ground wires of the cables are grounded to the cable enclosure elements of the cable connector assembly. However, it will be understood that this is non-limiting. For instance, in other examples, a ground wire of a cable may be inserted into a cable insert module—e.g., a "pin-through ground" configuration.

Figure 6:
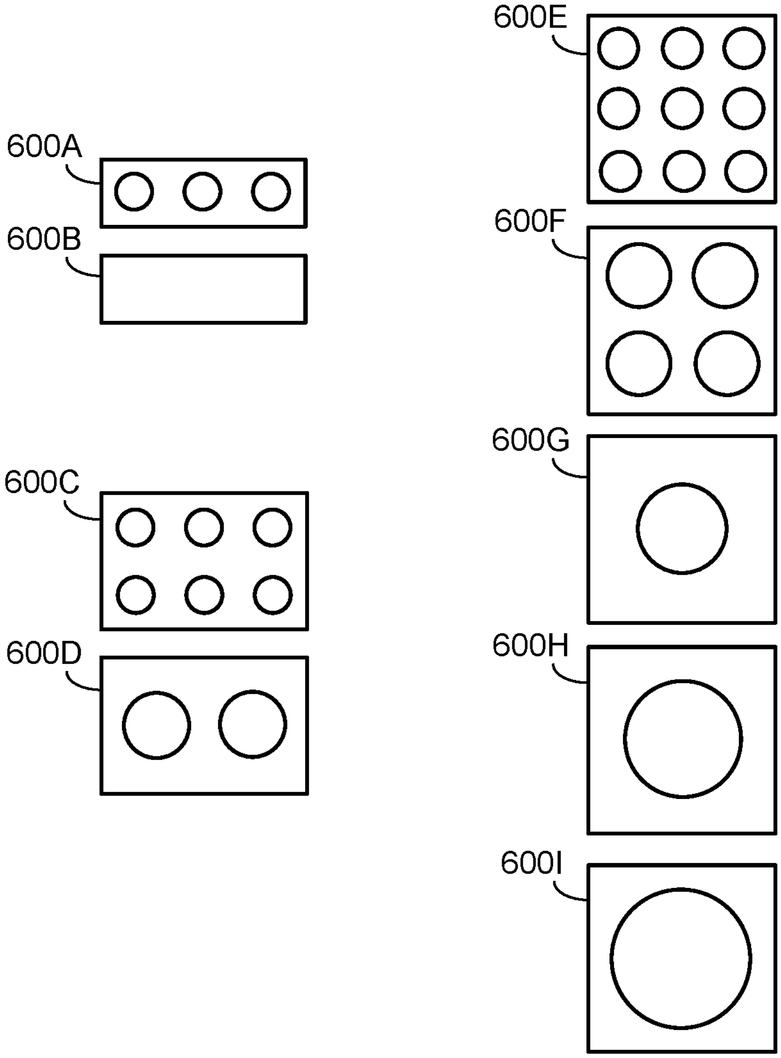
FIG. 6 illustrates various example designs for connectivity interfaces of cable insert modules.

As discussed above, different cable insert modules may use a wide variety of different arrangements of cable insertion recesses. FIG. 6 schematically illustrates several different non-limiting example designs for modules that are removably retainable in a module retainer. Modules 600A and 600B are "size 1" modules—e.g., those that fit within a single module slot of a module retainer. In this example, the cable insertion recesses of module 600A are size 20 cavities—e.g., they are sized to accommodate AWG 20, 22, and 24 wires. Module 600B is a blank spacer module as described above.

By contrast, cable insert modules 600C and 600D of FIG. 6 are "size 2" modules—e.g., they have a larger size and occupy two module slots of a module retainer. Cable insert module 600C also includes size 20 cavities, while cable insert module 600D includes two size 16 cavities—e.g., sized to accommodate AWG 16, 18, and 20 wires or fiber contacts. In other words, the cable insertion recesses of cable insert module 600D have a different size from the cable insertion recesses of other cable insert modules to accommodate a cable wire having a different wire gauge.

Cable insert modules 600E-600I are "size 3" cable insert modules—e.g., they have a larger size than cable insert modules 600A-D and occupy three modules slots of a module retainer. Although FIG. 6 only shows three sizes of cable insert modules, sizes 1, 2, and 3, it will be understood that this is non-limiting—e.g., in some embodiments, size 4 or greater cable insert modules may be used. In FIG. 6, cable insert module 600E includes size 20 cavities and cable insert module 600F includes size 16 cavities. Similarly, cable insert module 600G includes a single size 12 cavity (e.g., for AWG 12 or 14 wires, or a coaxial contact), cable insert module 600H includes a single size 8 cavity (e.g., for AWG 8 or 10 wires, or a coaxial contact), and cable insert module 600I includes a single size 5 cavity (e.g., for a coaxial contact). It will be understood that the specific sizes and arrangements of cable insertion recesses of the modules shown in FIG. 6 are non-limiting and presented only as examples.

Figure 7:
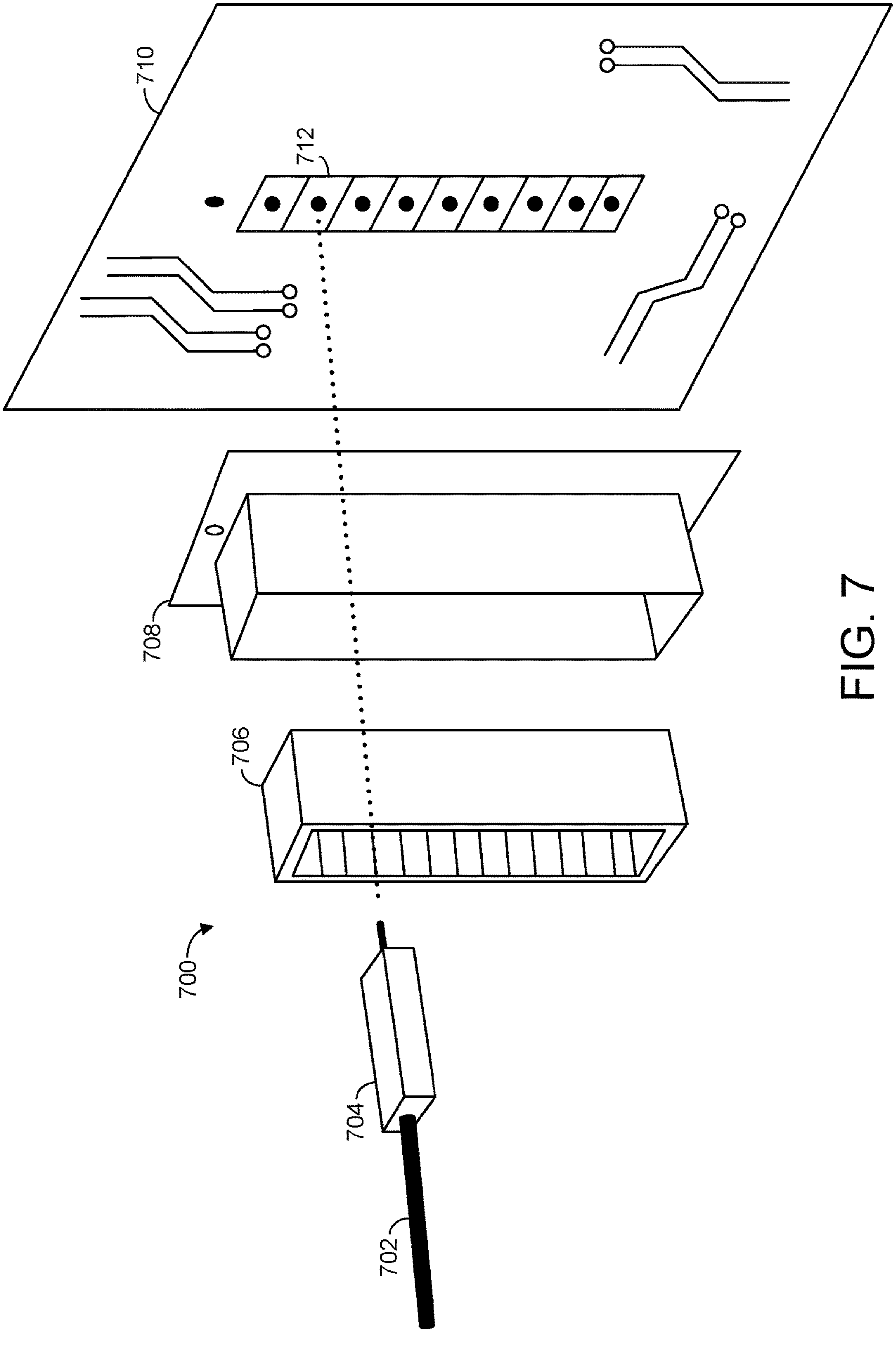
FIG. 7 schematically illustrates connection of a cable to a printed circuit board (PCB).

FIG. 7 depicts another non-limiting example cable connector assembly 700. In this example, the cable connector assembly is used to couple cables with a PCB as opposed to other cables. Specifically, FIG. 7 shows a cable wire 702 inserted into a cable insert module 704, which is removably retainable in a module retainer 706. In this example, the module retainer is additionally inserted into a retainer alignment adapter 708, which is affixable to a PCB 710. The PCB includes a connectivity interface 712 that is complementary to the connectivity interface of cable insert module 702—e.g., in this example, the module includes a conductive pin that is insertable into a pin insertion recess of the PCB. In other words, the connectivity interface of the cable insert module is sized and shaped for conductive coupling with a complementary connectivity interface of the PCB.

It will be understood that the specific arrangement depicted in FIG. 7 is non-limiting. For instance, in other examples, the PCB may include conductive pins in addition to, or instead of, pin insertion recesses, for coupling with connectivity interfaces of cable insert modules. Furthermore, in some examples, a retainer alignment adapter need not be used. Rather, for instance, the module retainer may be affixed directly to the PCB. Furthermore, it will be understood that a PCB is only one non-limiting example of an electronic device to which cables may be coupled using the cable connector assemblies described herein.

Figure 8:
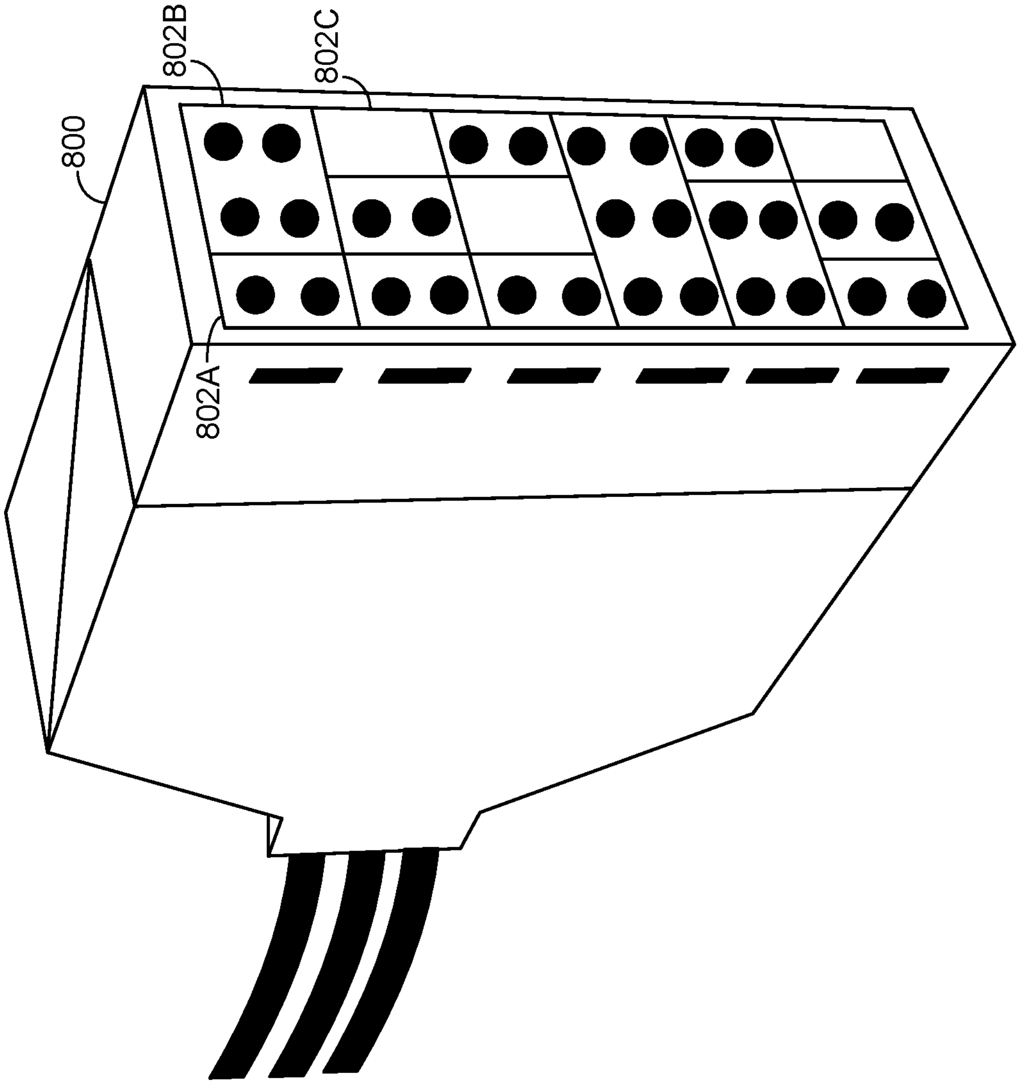
FIG. 8 schematically shows aspects of another example cable connector assembly.

The present disclosure has primarily focused on cable connector assemblies in which the cable insert modules are stacked within the module retainer. FIG. 8 depicts another example arrangement in which the module retainer includes a plurality of rows, where one or more modules are insertable into each row. In this manner, each row of the module retainer may constitute a stack of one or more cable insert modules and/or blank spacer modules, oriented perpendicular to a long axis of the module retainer. Specifically, FIG. 8 shows an example module retainer 800, into which a plurality of different modules have been inserted, three of which are labeled as cable insert modules 802A, 802B, and 802C. As shown, a variety of different module shapes, sizes, and cavity arrangements are represented—e.g., module 802B has a larger size than module 802A, while module 802C is a blank spacer module that omits connectivity interfaces.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a cable connector assembly comprises: a module retainer; and a set of two or more cable insert modules sized and shaped for removable retention within two or more module slots of the module retainer; wherein a cable insert module of the set of two or more cable insert modules includes a cable insertion recess sized and shaped for insertion of a cable wire of a cable, a connectivity interface on an opposing face of the cable insert module, and a transmission path between the cable insertion recess and the connectivity interface. In this example or any other example, the connectivity interface of the cable insert module is a pin insertion recess sized and shaped for insertion of a conductive pin of a connector of a second cable. In this example or any other example, the pin insertion recess includes a socket contact crimped onto a tip portion of the cable wire. In this example or any other example, the connectivity interface of the cable insert module includes a conductive pin conductively coupled with the cable wire, and wherein the conductive pin is sized and shaped for insertion into a pin insertion recess of a connector of a second cable. In this example or any other example, the conductive pin includes a pin contact crimped onto a tip portion of the cable wire. In this example or any other example, the cable connector assembly further comprises a printed circuit board (PCB), and wherein the connectivity interface of the cable insert module is sized and shaped for coupling with a complementary connectivity interface of the PCB. In this example or any other example, the cable connector assembly further comprises: a second module retainer; a second set of two or more cable insert modules sized and shaped for removable retention within two or more module slots of the second module retainer, wherein the second set of two or more cable insert modules includes a second cable insert module coupled with a second cable wire of a second cable; and a retainer alignment adapter sized and shaped to hold the module retainer in alignment with the second module retainer such that transmission is established between the cable wire and the second cable wire. In this example or any other example, the cable insert module further includes a second cable insertion recess for insertion of a second cable wire, and a second connectivity interface on the opposing face of the cable insert module. In this example or any other example, the cable insert module includes three or more cable insertion recesses configured for insertion of two or more phase wires and a ground wire of the cable. In this example or any other example, the set of two or more cable insert modules further includes a second cable insert module having a second cable insertion recess, wherein a size of the second cable insertion recess is different from a size of the cable insertion recess to accommodate a second cable wire of a second cable, and wherein the second cable wire has a different wire gauge from the cable wire. In this example or any other example, the set of two or more cable insert modules further includes a second cable insert module having a different number of connectivity interfaces from the cable insert module. In this example or any other example, the cable connector assembly further comprises a blank spacer module sized and shaped for removable retention within one or more module slots of the module retainer. In this example or any other example, the cable insert module occupies one module slot of the module retainer, and wherein a second cable insert module of the set of two or more cable insert modules has a larger size than the cable insert module, such that the second cable insert module occupies more than one module slot of the module retainer. In this example or any other example, the cable insert module includes one or more retention clips configured to, while the cable insert module is inserted into the module retainer, interface with corresponding retention apertures of the module retainer to removably retain the cable insert module within the module retainer. In this example or any other example, the cable connector assembly further comprises a cable enclosure element removably attachable to the module retainer, wherein the cable enclosure element is configured to limit movement of the cable relative to the module retainer. In this example or any other example, the cable enclosure element comprises two separable halves that collectively enclose a portion of the cable. In this example or any other example, the cable enclosure element further provides electromagnetic interference (EMI) shielding. In this example or any other example, a ground wire of the cable is grounded to the cable enclosure element. In this example or any other example, the cable is a multi-conductor cable including two or more cable wires. In this example or any other example, the cable is a shielded twisted pair cable.

In an example, a cable connector assembly comprises: a module retainer; and a set of two or more cable insert modules sized and shaped for removable retention within module slots of the module retainer; wherein a first cable insert module of the set of two or more cable insert modules occupies a first module slot of the module retainer and includes a first cable insertion recess sized and shaped for insertion of a first cable wire of a first cable, a first connectivity interface on an opposing face of the first cable insert module, and a first transmission path between the first cable insert recess and the first connectivity interface; and wherein a second cable insert module of the set of two or more cable insert modules occupies a second module slot of the module retainer and includes a second cable insertion recess sized and shaped for insertion of a second cable wire of a second cable, a second connectivity interface on an opposing face of the second cable insert module, and a second transmission path between the second cable insert recess and the second connectivity interface.

In an example, a cable connector assembly comprises: a first module retainer; a first set of two or more cable insert modules sized and shaped for removable retention within module slots of the first module retainer, the first set of two or more cable insert modules including a first cable insert module coupled with a first cable, and the first cable insert module including a first connectivity interface; a second module retainer; a second set of two or more cable insert modules sized and shaped for removable retention within module slots of the second module retainer, the second set of two or more cable insert modules including a second cable insert module coupled with a second cable, and the second cable insert module including a second connectivity interface; and a retainer alignment adapter sized and shaped to hold the first module retainer in alignment with the second module retainer, such that the first connectivity interface of the cable insert module is aligned and coupled with the second connectivity interface of the second cable insert module.

The invention claimed is:

1. A cable connector assembly, comprising:

a first module retainer;

a set of two or more cable insert modules sized and shaped for removable retention within two or more module slots of the first module retainer;

wherein a first cable insert module of the set of two or more cable insert modules includes a cable insertion recess on a first face of the first cable insert module, the cable insertion recess sized and shaped for insertion of a cable wire of a cable, a connectivity interface on a second face of the first cable insert module opposing the first face, and a transmission path between the cable insertion recess and the connectivity interface, wherein a first side of the first cable insert module extending from the first face to the second face includes a first alignment protrusion extending away from the first side, and a second side of the first cable insert module includes a second alignment protrusion extending away from the second side, the second alignment protrusion having a different polygonal profile from the first alignment protrusion; and a retainer alignment adapter sized and shaped to hold the first module retainer in alignment with a second module retainer, the second module retainer including a second set of two or more cable insert modules, wherein the first module retainer and the second module retainer form a retainer pair, and wherein the retainer pair is one of two or more retainer pairs held within the retainer alignment adapter.

2. The cable connector assembly of claim 1, wherein the connectivity interface of the first cable insert module is a pin insertion recess sized and shaped for insertion of a conductive pin of a connector of a second cable.

3. The cable connector assembly of claim 2, wherein the pin insertion recess includes a socket contact affixed to a tip portion of the cable wire.

4. The cable connector assembly of claim 1, wherein the connectivity interface of the first cable insert module includes a conductive pin conductively coupled with the cable wire, and wherein the conductive pin is sized and shaped for insertion into a pin insertion recess of a connector of a second cable.

5. The cable connector assembly of claim 4, wherein the conductive pin includes a pin contact affixed to a tip portion of the cable wire.

6. The cable connector assembly of claim 1, wherein the second set of two or more cable insert modules includes a second cable insert module coupled with a second cable wire of a second cable such that transmission is established between the cable wire and the second cable wire.

7. The cable connector assembly of claim 1, wherein the first cable insert module further includes a second cable insertion recess for insertion of a second cable wire, and a second connectivity interface on the opposing face of the cable insert module.

8. The cable connector assembly of claim 7, wherein the first cable insert module includes three or more cable insertion recesses configured for insertion of two or more phase wires and a ground wire of the cable.

9. The cable connector assembly of claim 1, wherein the set of two or more cable insert modules further includes a second cable insert module having a second cable insertion recess, wherein a size of the second cable insertion recess is different from a size of the cable insertion recess of the first cable insert module to accommodate a second cable wire of a second cable, and wherein the second cable wire has a different wire gauge from the cable wire.

10. The cable connector assembly of claim 1, wherein the set of two or more cable insert modules further includes a second cable insert module having a different number of connectivity interfaces from the first cable insert module.

11. The cable connector assembly of claim 1, further comprising a blank spacer module sized and shaped for removable retention within one or more module slots of the first module retainer.

12. The cable connector assembly of claim 1, wherein the first cable insert module occupies one module slot of the first module retainer, and wherein a second cable insert module of the set of two or more cable insert modules has a larger size than the first cable insert module, such that the second cable insert module occupies more than one module slot of the first module retainer.

13. The cable connector assembly of claim 1, wherein the first cable insert module includes one or more retention clips configured to, while the first cable insert module is inserted into the first module retainer, interface with corresponding retention apertures of the first module retainer to removably retain the first cable insert module within the first module retainer.

14. The cable connector assembly of claim 1, wherein the cable is a multi-conductor cable including two or more cable wires.

15. The cable connector assembly of claim 14, wherein the cable is a shielded twisted pair cable.

16. The cable connector assembly of claim 1, wherein the retainer pair is one of at least three retainer pairs held within the retainer alignment adapter, and wherein each module retainer of the at least three retainer pairs includes a respective set of cable insert modules.

17. The cable connector assembly of claim 1, wherein a second cable insert module of the set of two or more cable insert modules includes two or more pin insertion recesses and two or more pairs of connectivity interfaces, each pair of connectivity interfaces respectively corresponding to a different pin insertion recess of the two or more pin insertion recesses, and wherein a transmission path of the second cable insert module comprises an internal bus connecting each pin insertion recess to its corresponding pair of connectivity interfaces.

18. The cable connector assembly of claim 1, wherein the first alignment protrusion has a trapezoidal profile, and wherein the second alignment protrusion has a rectangular profile.

19. The cable connector assembly of claim 1, wherein the first module retainer includes, on a side of the first module retainer parallel to a module insertion axis, two or more windows respectively aligned with the two or more module slots, each window revealing at least a portion of a surface of a corresponding cable insert module inserted into a corresponding module slot.

20. The cable connector assembly of claim 1, wherein at least three different sizes of cable insert modules are represented between the first set of two or more cable insert modules and the second set of two or more cable insert modules, and wherein cable insert modules having different module sizes occupy different numbers of module slots.

21. A cable connector assembly, comprising:

a first module retainer;

a set of two or more cable insert modules sized and shaped for removable retention within module slots of the first module retainer;

a second module retainer;

a second set of two or more cable insert modules sized and shaped for removable retention within module slots of the second module retainer; and a retainer alignment adapter sized and shaped to hold the first module retainer in alignment with the second module retainer, wherein the first module retainer and the second module retainer form a retainer pair, and wherein the retainer pair is one of two or more retainer pairs held within the retainer alignment adapter;

wherein a first cable insert module of the set of two or more cable insert modules occupies a first module slot of the first module retainer and includes a first cable insertion recess on a first face of the first cable insert module, the first cable insertion recess sized and shaped for insertion of a first cable wire of a first cable, a first connectivity interface on a second face of the first cable insert module opposing the first face, and a first transmission path between the first cable insert recess and the first connectivity interface, wherein a first side of the first cable insert module extending from the first face to the second face includes a first alignment protrusion extending away from the first side, and a second side of the first cable insert module includes a second alignment protrusion extending away from the second side, the second alignment protrusion having a different polygonal profile from the first alignment protrusion; and wherein a second cable insert module of the set of two or more cable insert modules occupies a second module slot of the second module retainer and includes a second cable insertion recess sized and shaped for insertion of a second cable wire of a second cable, a second connectivity interface on an opposing face of the second cable insert module, and a second transmission path between the second cable insert recess and the second connectivity interface.

22. A cable connector assembly, comprising:

a first module retainer;

a first set of two or more cable insert modules sized and shaped for removable retention within module slots of the first module retainer, the first set of two or more cable insert modules including a first cable insert module coupled with a first cable, and the first cable insert module including a cable insertion recess on a first face of the first cable insert module, the cable insertion recess sized and shaped for insertion of a cable wire of the first cable, a first connectivity interface on a second face of the first cable insert module opposing the first face, and a transmission path between the cable insertion recess and the first connectivity interface, wherein a first side of the first cable insert module extending from the first face to the second face includes a first alignment protrusion extending away from the first side, and a second side of the first cable insert module includes a second alignment protrusion extending away from the second side, the second alignment protrusion having a different polygonal profile from the first alignment protrusion;

a second module retainer;

a second set of two or more cable insert modules sized and shaped for removable retention within module slots of the second module retainer, the second set of two or more cable insert modules including a second cable insert module coupled with a second cable, and the second cable insert module including a second connectivity interface; and a retainer alignment adapter sized and shaped to hold the first module retainer in alignment with the second module retainer, such that the first connectivity interface of the first cable insert module is aligned and coupled with the second connectivity interface of the second cable insert module, wherein the first module retainer and the second module retainer form a retainer pair, and wherein the retainer pair is one of two or more retainer pairs held within the retainer alignment adapter.

* * * * *